United States Patent
Gabbard

(12) 
(10) Patent No.: US 6,232,884 B1
(45) Date of Patent: *May 15, 2001

(54) REMOTELY OPERABLE VEHICLE DISABLING SYSTEM

(76) Inventor: Charles H. Gabbard, 436 Heliotrope, Corona Del Mar, CA (US) 92625

( * ) Notice: Subject to any disclaimer, the term of this patent is extended or adjusted under 35 U.S.C. 154(b) by 0 days.

This patent is subject to a terminal disclaimer.

(21) Appl. No.: 09/081,473

(22) Filed: May 19, 1998

Related U.S. Application Data

(63) Continuation-in-part of application No. 08/735,434, filed on Jan. 2, 1997, now abandoned.

(51) Int. Cl.[7] ................................................ G08C 19/00
(52) U.S. Cl. ............................ 340/825.72; 340/425.5; 340/426; 340/825.06; 307/10.2; 348/148; 180/167; 180/173
(58) Field of Search .................... 340/825.72, 825.06, 340/425.5, 426; 307/10.2; 348/143, 148, 149, 158; 359/154, 157; 180/167, 173

(56) References Cited

U.S. PATENT DOCUMENTS

| | | | |
|---|---|---|---|
| 4,001,822 | * | 1/1977 | Sterzer .................................. 343/173 |
| 4,660,528 | * | 4/1987 | Buck ..................................... 123/335 |
| 4,878,050 | | 10/1989 | Kelley .............................. 340/825.06 |
| 5,012,335 | * | 4/1991 | Cohodar .............................. 348/158 |
| 5,293,527 | | 3/1994 | Sutton et al. ................... 340/825.57 |
| 5,533,589 | | 7/1996 | Critzer ................................. 180/287 |
| 5,588,038 | | 12/1996 | Snyder ................................. 379/57 |

OTHER PUBLICATIONS

Laser Technology—"Beyond a Shadow of a Doubt, . . . " LTI20–20.,of 4 pages No Page #'s.

* cited by examiner

Primary Examiner—Michael Horabik
Assistant Examiner—Timothy Edwards, Jr.
(74) Attorney, Agent, or Firm—Stetina Brunda Garred & Brucker

(57) ABSTRACT

A remotely operable vehicle disabling system for terminating operation of a vehicle. The system has a remotely operable transmit unit for transmitting a command shutdown message to a command-receiver vehicle unit in a vehicle. The vehicle unit is in communication with at least one operational component and capable of shutting down that component to thereby terminate vehicle operation. The transmit unit can initially transmit a query message prior to the shutdown message to confirm vehicle identity or to confirm the presence of the vehicle disabling system. Correspondingly, the vehicle unit is capable of receiving both the query message and the shutdown message and of responding to the query message, with all such communication activities preferably being encoded with a continuously changing key. The disabling system provides a safe and efficient manner for law enforcement personnel to apprehend criminals attempting to escape in vehicles.

22 Claims, 2 Drawing Sheets

REMOTELY OPERABLE VEHICLE DISABLING SYSTEM

CROSS REFERENCE TO RELATED APPLICATION

This application is a continuation-in-part application of co-pending U.S. patent application Ser. No. 08/735,434, filed Jan. 2, 1997, now abandoned.

FIELD OF THE INVENTION

This invention relates in general to vehicle security, and in particular to a remotely operable vehicle disabling system where a remote command transmitter transmits a command to a receiver capable of terminating vehicle operation and situated within the vehicle to be so disabled.

BACKGROUND OF THE INVENTION

The use of stolen vehicles in committing crimes and in escaping capture by law enforcement officials represents a major criminal activity in both urban and rural communities. Criminals may use stolen vehicles in the commission of bank, jewelry and retail store robberies, fleeing from arrest or re-arrest after an escape, a hit-and-run accident, and other illegal actions. When such an event occurs and identity of the stolen vehicle is known, police officers who spot the vehicle will give chase to hopefully apprehend the driver and any accompanying passengers. Current statistics show that there are approximately 27,000 vehicle chases in the United States everyday. Unfortunately, such police chases can result in tragic endings when innocent third parties are involved in collisions, shootings, or the like during the chase procedure.

As is expected, the longer a chase takes, the greater are the chances that non-involved parties will become victims of the pursuit. As a result, law enforcement officials may need to terminate chase efforts because of danger to third parties and thus permit criminals to escape apprehension. When such termination is not a viable choice, however, risks continue to accrue until the course of the chase is resolved. In view of the danger and potential injury to innocent third parties because of police chases, it is evident that a need is present for technology that can allow police personnel to apprehend such fleeing criminals without lengthy pursuits. Accordingly, a primary object of the present invention is to provide a remotely operable vehicle disabling system for terminating operation of a vehicle upon transmission of a command.

Another object of the present invention is to provide such a disabling system whereby the vehicle has a command receiver in communication with equipment capable of shutting down engine operation.

Yet another object of the present invention is to provide such a disabling system wherein fuel flow or electrical power to the vehicle engine is terminated to thereby effectuate a shut down.

Still another object of the present invention is to provide a disabling system wherein the command receiver of the vehicle to be disabled first transmits a vehicle-identity confirmation signal to thereby confirm correct vehicle apprehension.

Yet another object of the present invention is to provide a disabling system wherein a command, a command receipt, and a vehicle-identity signal are key-coded using a continuously changing key.

Another object of the invention is to provide a disabling system wherein a vehicle owner can effectuate shut down and disenablement of the vehicle when it is parked.

These and other objects of the present invention will become apparent throughout the description which now follows.

SUMMARY OF THE INVENTION

The present invention is a remotely operable vehicle disabling system for terminating operation of a vehicle. The system comprises, first of all, a remotely operable transmit unit for transmitting a command shutdown message which may preferably be an infrared beam. Second, the system comprises a command-receiver vehicle unit capable of responding to the command and physically situated at a site of the vehicle such that a shutdown message from the transmit unit can reach the vehicle unit. Both the transmit unit and vehicle unit are encoded to react only with each other, thereby eliminating random transmissions from reaching the vehicle unit. The vehicle unit is in communication with at least one operational component of the vehicle and capable of shutting down that component upon receipt of a shutdown message from the transmit unit to thereby terminate vehicle operation.

Preferably, the transmit unit also initially transmits a query message prior to the shutdown message to confirm vehicle identity or to simply confirm the presence of the vehicle disabling system. The vehicle unit is capable of receiving both the query message and the shutdown message and of responding to the query message. When the query response is an expected response, the vehicle unit can substantially immediately react to the shutdown message and accomplish shutdown of the operational component with which it is in communication. While the query and shutdown messages can be accomplished through infrared transmissions, the query response can be by radio signal to the transmit unit which is provided with a radio signal receiver. The system can also include a transmitter hand unit for remotely activating the transmit unit. Additionally, a hand held transmit unit can be included in the system. The query message and the shutdown message of the transmit unit and the query message response of the vehicle unit preferably are encoded with a continuously changing key determined by time of day and an algorithm common to both units.

Preferred operational components with which the receiver can be in communication include a fuel flow termination device and an electrical power termination device. Preferably, the operational component is additionally in communication with a tamper-evident indicator disposed at an external site of the vehicle. Attempted or actual disengagement of the component activates the indicator to thereby provide visual notification of such attempted or actual disengagement. Such an indicator should be an out of the ordinary event such as a white light illuminated on the rear of a vehicle to thereby draw attention. In addition to having the operational components in communication with the receiver for disabling of an already-operating vehicle, the operational components can also be in communication with a keyed ignition switch of the vehicle. In that instance, conventional computer circuitry including a computer chip on the key would shut down the operational components when the key is absent to thereby provide anti-theft functionality.

As is apparent, the disabling system of the present invention provides a safe and efficient manner for law enforcement personnel to apprehend criminals attempting to escape in vehicles. The system can be incorporated in new vehicles during their production, or it can be retrofitted to vehicles now in operation. Use of the system can ensure reduced risk and danger to innocent third parties as well as to law enforcement personnel by essentially eliminating the need for any vehicle chases.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENTS

Figures 1, 2:
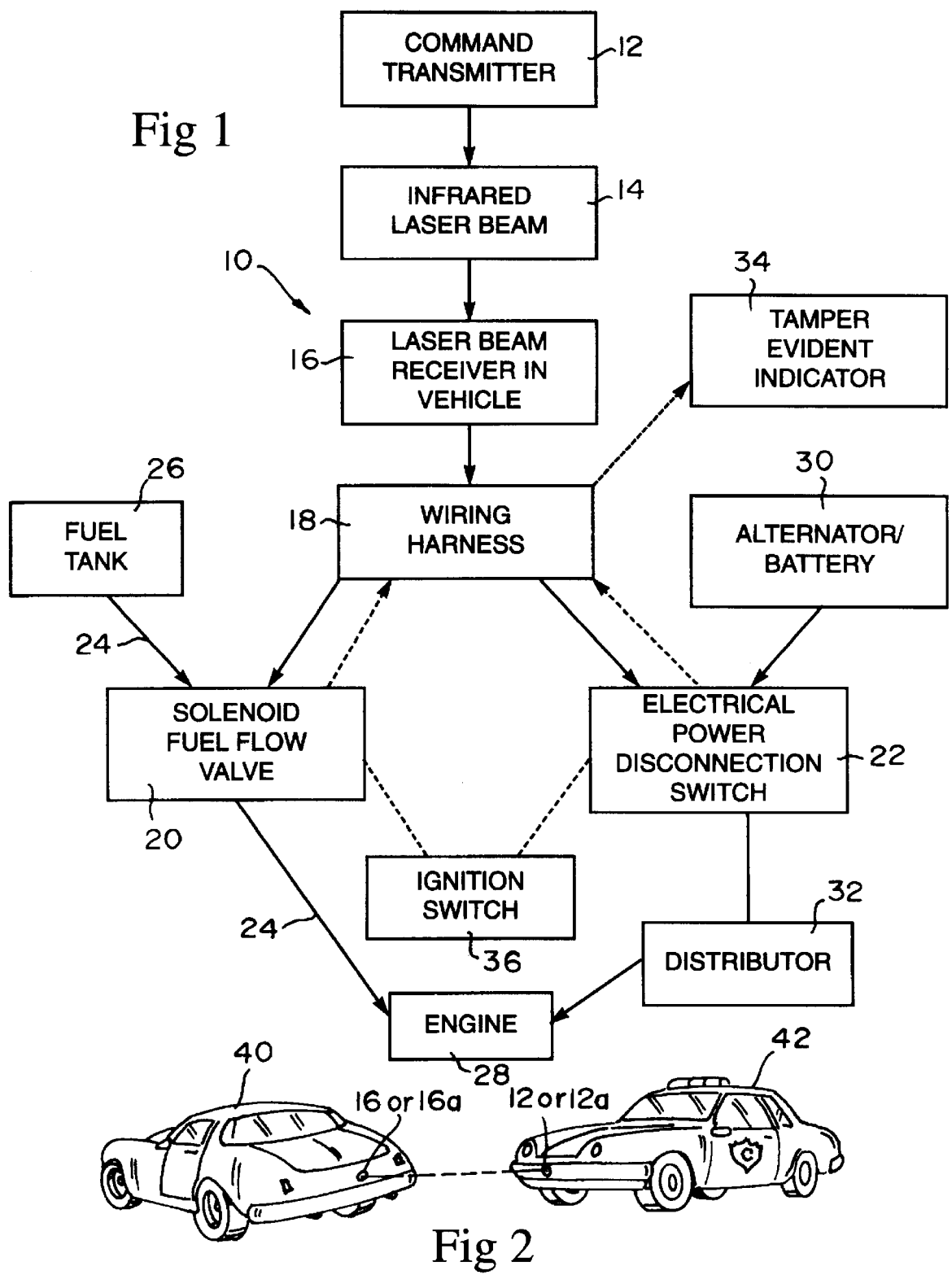
FIG. 1 is a flow diagram of a first embodiment of a remotely operable vehicle disabling system for terminating operation of a vehicle.
FIG. 2 is an illustration of a law enforcement vehicle in pursuit of another vehicle equipped with a vehicle disabling system.

Referring to FIG. 1, a vehicle disabling system 10 is shown. The system 10 comprises, first, a remotely operable command transmitter transmit unit 12 which transmits an infrared laser beam 14 preferably in a relatively narrow width of about three feet over a distance of about 1,000–1, 800 feet. Such beam transmittal can be achieved by conventionally available laser gun transmitters such as that manufactured by Laser Technology, Inc., Englewood, Colo., Model LTI 20-20. Mounted within a vehicle is at least one infrared laser beam receiver vehicle unit 16 for receiving the beam 14. The vehicle unit 16 must be situated such that beam entry can be readily achieved. One preferable location for many vehicles is within the housing of a typical back-up light or other site disposed along a portion of the rear of a vehicle. FIG. 2 is included to illustrate possible placement wherein the vehicle unit 16 is mounted at the rear of a vehicle 40 while the transmit unit 12 is mounted at the front of a police vehicle 42. Alignment of the transmit unit 12 and vehicle unit 16 during a pursuit, for example, can result in a police officer being able to disable the vehicle 40 by simply transmitting a beam to reach the receiver 16 of the pursued automobile. Other vehicle units 16 can be provided on the roof or other top surface of the vehicle for use with helicopter pursuits, within the passenger compartment behind a window, or any other desired mounting location. Because the exteriorly visible portion of the vehicle unit 16 can be very small, location choices on vehicles are abundant. All transmit units and vehicle units can be encoded identically nationwide to thereby provide vehicle unit access for all law enforcement transmit units irrespective of location of the vehicle being pursued to thereby accomplish vehicle shutdown irrespective of vehicle identity. Alternatively, the transmit unit 12 and vehicle unit 16 can be provided with "handshake" encoding as described later in association with the embodiment illustrated in FIG. 3.

The vehicle unit 16 is in communication via a wiring harness 18 with both a closable solenoid fuel flow valve 20 and an electrical power disconnection switch 22, both as known in the art. The valve 20 is situated in a fuel line 24 leading from a fuel tank 26 to the vehicle engine 28, and preferably has a reset button located someplace within the vehicle such as in the trunk compartment. The power disconnection switch 22 is disposed between the power source 30, generally an alternator and battery, and a conventional distributor 32 found in most engines. While the preferred embodiment includes a connection from the vehicle unit 16 to both a fuel flow valve 20 and a power disconnection switch 22, it is not necessary to have or include both of these operational components. Instead, only one or the other of the valve 20 and switch 22 can be in communication with the vehicle unit 16. Further, in a retrofit situation where a vehicle owner wishes to add the disabling system, addition of a fuel flow valve 20 is relatively easily performed. A tamper-evident indicator 34 is provided in communication with the valve 20 and switch 22 via the harness 18. A preferred indicator is a white light such as a back-up light that remains illuminated to thereby draw attention to an unusual event. If attempted or actual disengagement of the valve 20 or switch 22 occurs, the indicator is permanently activated to thereby alert passers-by as well as law enforcement personnel of the presence of tampering and a probable security breach.

In addition to being in communication with the vehicle unit 16, the valve 20 and switch 22 can be in communication with the keyed ignition switch 36 of the vehicle. A key (not shown) having a computer chip therewith is provided to complete a circuit as known in the art such that absence of a key results in a shut down of both the valve 20 and switch 22. When such communication is provided, the disabling system 10 additionally functions as an anti-theft system.

Figure 3:
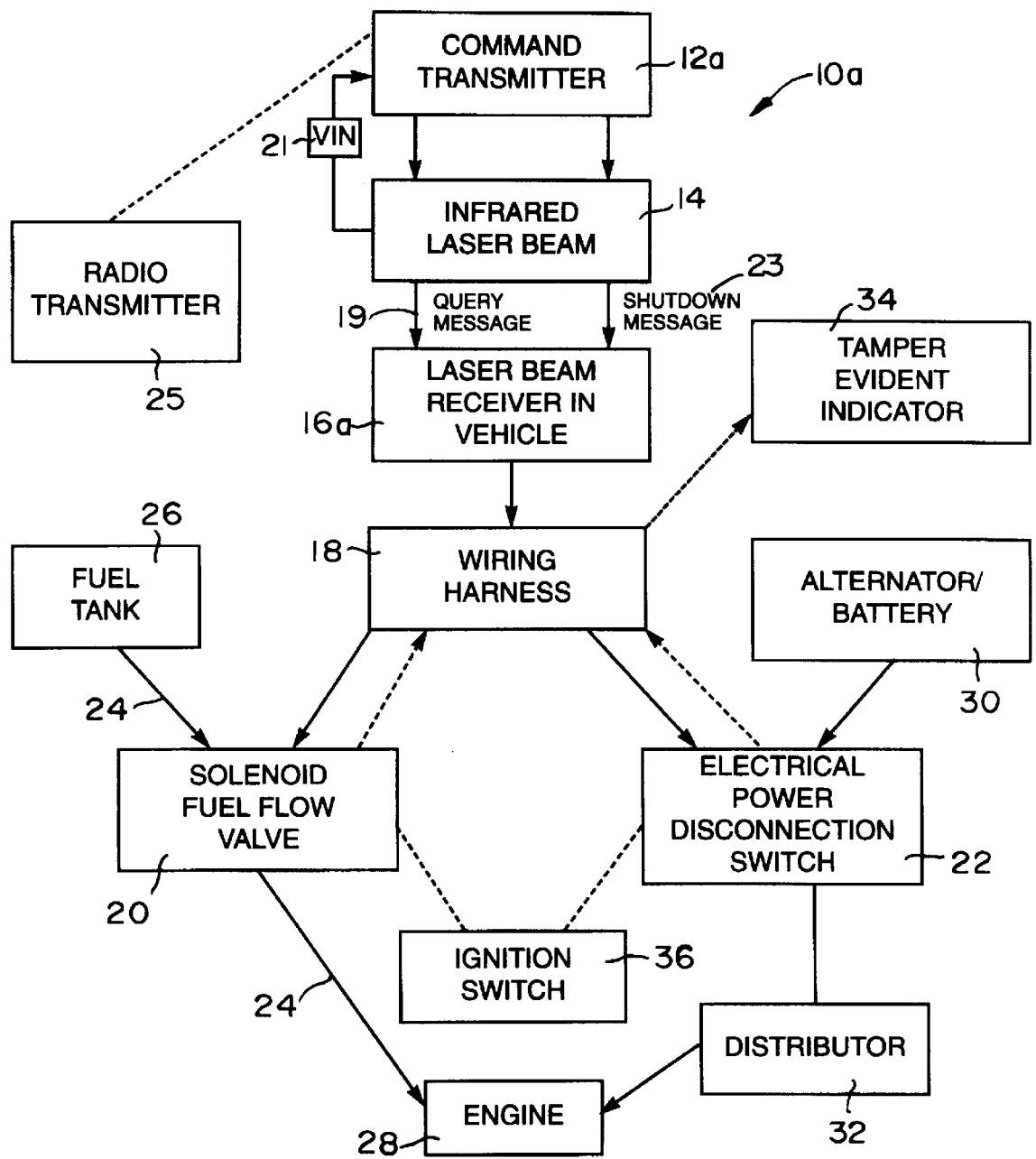
FIG. 3 is a flow diagram of a second embodiment of a remotely operable vehicle disabling system for terminating operation of a vehicle.

As earlier noted, the transmit unit 12 and vehicle unit 16 can be provided with "handshake" encoding as exemplified in the vehicle disabling system embodiment 10a shown in FIG. 3. In particular, the encoding system is constructed with circuitry as known in the art to provide a continuously changing coded key common to both the transmit unit 12a and the vehicle unit 16a. This code is determined by time of day and an algorithm substantially identically operable in both the transmit unit 12a and the vehicle unit 16a, with the time of day acceptable range being ± one hour to thereby compensate for expected non-exact time settings. The transmit unit 12a first transmits an encoded query message 19 to which the vehicle unit 16a responds with an encoded stream of vehicle identification information 21 which can include the vehicle identification number (VIN). This information can be transmitted by radio signal from the vehicle unit 16a within which it is stored for such transmittal to the transmit unit 12a which is, of course, capable of receiving such radio signals in a conventional manner as known in the art. Upon recognition of the VIN or other recognizable vehicle identification, the transmit unit 12a sends an encoded shutdown message 23 to the vehicle unit 16a which causes the vehicle unit 16a to effectuate the operational-component shutdown through the wiring harness 18 in the same manner as described for FIG. 1. Optionally, a conventional radio signal transmitter hand unit 25 can be included in the system 10 for activating the transmit unit 12a when an operator is away from, but in the close proximity to (e.g. up to about 100 yards), the transmit unit 12a. In this case, the transmit unit 12a is equipped with a radio-signal activator switch (not shown) as known in the art to power the transmit unit 12a.

Operability of the embodiment of FIG. 1 is initiated when a law enforcement officer in a police vehicle 42 is positioned behind a vehicle 40 that requires apprehension. The officer positions the police vehicle 42 such that the infrared laser beam 14 from the transmit unit 12 can be accepted by the vehicle unit 16. When such acceptance occurs, the vehicle unit 16 signals through the wiring harness 18 to effectuate shutdown of fuel and/or electricity flow to thereby disable the vehicle 40.

In a similar manner, the embodiment shown in FIG. 3 also functions to disable a vehicle 40. When both the police vehicle 42 and the vehicle 40 to be apprehended are traveling or in traffic, the officer activates the transmit unit 12a which first sends a query message 19 to either confirm identity of the vehicle 40 such as through a VIN recognizable to the transmit unit 12a or to ascertain that a system 10a is, in fact, on-board. Assuming the query message response 21 is affirmative, the transmit unit 12a immediately sends a shutdown message 23 to the vehicle unit 16a, upon which the vehicle unit 16a signals through the wiring harness 18 in the same manner as in the embodiment of FIG. 1 to effectuate shutdown of fuel and/or electricity flow and thereby disable the vehicle 40. The optional inclusion of the radio signal transmitter hand unit 25 with the system 10a for remotely activating the system 10a addresses the situation where a police officer already has the vehicle 40 stopped and is out of the police vehicle 42 where the transmit unit 12 is located. Should the driver of the vehicle 40 then decide to unlawfully leave the scene, the police officer can simply operate the radio signal transmitter hand unit 25 to activate the system 10a and disable the vehicle 40 without returning to the police vehicle 42.

As is apparent, the present invention provides a vehicle apprehension method that is effective without requiring substantial risk because of high speed or otherwise dangerous vehicular pursuits that are, in essence, stopped before they begin. Benefits inherent in the invention therefore include safety for persons in the proximity of an apprehension site, property preservation since destructive activity caused by speeding vehicles is precluded, and return of stolen vehicles to rightful owners without high repair expenses which are reflected in insurance costs. While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A remotely operable vehicle disabling system for terminating operation of a vehicle, the system comprising:
   a) a remotely operable transmit unit for transmitting a query message and a shutdown message and for receiving a response to the query message;
   b) a transmitter hand unit for remotely activating the transmit unit; and
   c) a vehicle unit capable of receiving the query message and the shutdown message and for providing a query message response, with said vehicle unit being in communication with at least one operational component of the vehicle and capable of shutting down said component upon receipt of a shutdown message from the transmit unit to thereby terminate vehicle operation.

2. A remotely operable vehicle disabling system as claimed in claim 1 wherein the transmit unit is an infrared transmitter transmitting an infrared laser beam bearing the query message and the shutdown message.

3. A remotely operable vehicle disabling system as claimed in claim 1 wherein the query message, shutdown message and query message response are encoded with a continuously changing key determined by time of day and an algorithm common to the query message, shutdown message and query message response.

4. A remotely operable vehicle disabling system as claimed in claim 1 wherein the remotely operable transmit unit is mounted within a law enforcement vehicle.

5. A remotely operable vehicle disabling system as claimed in claim 1 wherein the remotely operable transmit unit is handheld.

6. A remotely operable vehicle disabling system as claimed in claim 1 wherein the operational component is a fuel flow termination device.

7. A remotely operable vehicle disabling system as claimed in claim 6 wherein the fuel flow termination device is a closable valve disposed in a fuel line leading from a fuel source to an engine, said valve being closable by the vehicle unit upon receipt of a shutdown message from the transmit unit to thereby close the valve.

8. A remotely operable vehicle disabling system as claimed in claim 1 wherein the operational component is an electrical power termination device for terminating electrical operating power leading from a power source to an engine.

9. A remotely operable vehicle disabling system as claimed in claim 8 wherein the electrical power termination device is a power disconnection switch situated between the power source and a power distributor for the engine, said switch being operable by the vehicle unit upon receipt of a shutdown message from the transmit unit to thereby shut down electrical power.

10. A remotely operable vehicle disabling system as claimed in claim 1 additionally comprising a visually observable tamper-evident indicator in communication with the operational component and disposed at an external site of the vehicle whereby tampering with the operational component activates the indicator.

11. A remotely operable vehicle disabling system as claimed in claim 10 wherein the visually observable tamper-evident indicator is a light disposed at an external site of the vehicle.

12. A remotely operable vehicle disabling system as claimed in claim 1 wherein the query message and the shutdown message of the transmit unit are encoded and the query message response of the vehicle unit is encoded with a code complimentarily to the code of the query message.

13. A remotely operable vehicle disabling system as claimed in claim 12 wherein the query message, shutdown message and query message response are encoded with a continuously changing key determined by time of day and an algorithm common to the query message, shutdown message and query message response.

14. A remotely operable vehicle disabling system for terminating operation of a vehicle, the system comprising:
   a) a remotely operable transmit unit for transmitting a shutdown message;
   b) a transmitter hand unit for remotely activating the transmit unit;
   c) a vehicle unit capable of receiving the shutdown message, with said vehicle unit being in communication with at least one operational component of the vehicle and capable of shutting down said component upon receipt of the shutdown message from the transmit unit to thereby terminate vehicle operation; and
   d) a visually observable tamper-evident indicator in communication with the operational component and disposed at an external site of the vehicle whereby tampering with the operational component activates the indicator.

15. A remotely operable vehicle disabling system as claimed in claim 14 wherein the transmit unit is an infrared transmitter transmitting an infrared laser beam bearing the shutdown message.

16. A remotely operable vehicle disabling system as claimed in claim 14 wherein the visually observable tamper-evident indicator is a light disposed at an external site of the vehicle.

17. A remotely operable vehicle disabling system as claimed in claim 14 wherein the remotely operable transmit unit is mounted within a law enforcement vehicle.

18. A remotely operable vehicle disabling system as claimed in claim 14 wherein the remotely operable transmit unit is handheld.

19. A remotely operable vehicle disabling system as claimed in claim 14 wherein the operational component is a fuel flow termination device.

20. A remotely operable vehicle disabling system as claimed in claim 19 wherein the fuel flow termination device is a closable valve disposed in a fuel line leading from a fuel source to an engine, said valve being closable by the vehicle unit upon receipt of a shutdown message from the transmit unit to thereby close the valve.

21. A remotely operable vehicle disabling system as claimed in claim 14 wherein the operational component is an electrical power termination device for terminating electrical operating power leading from a power source to an engine.

22. A remotely operable vehicle disabling system as claimed in claim 21 wherein the electrical power termination device is a power disconnection switch situated between the power source and a power distributor for the engine, said switch being operable by the vehicle unit upon receipt of a shutdown message from the transmit unit to thereby shut down electrical power.

* * * * *